(12) United States Patent
Ozaki et al.

(10) Patent No.: US 9,027,979 B2
(45) Date of Patent: May 12, 2015

(54) ROTARY DAMPER AND OPENING AND CLOSING MECHANISM FOR A VEHICLE DOOR

(71) Applicants: Keigo Ozaki, Kosai (JP); Tatsuya Kitada, Hamamatsu (JP)

(72) Inventors: Keigo Ozaki, Kosai (JP); Tatsuya Kitada, Hamamatsu (JP)

(73) Assignee: Kabushiki Kaisha Somic Ishikawa, Tokyo (JP)

( * ) Notice: Subject to any disclaimer, the term of this patent is extended or adjusted under 35 U.S.C. 154(b) by 0 days.

(21) Appl. No.: 14/052,674

(22) Filed: Oct. 11, 2013

(65) Prior Publication Data

US 2014/0035310 A1 Feb. 6, 2014

Related U.S. Application Data

(63) Continuation-in-part of application No. 14/110,563, filed as application No. PCT/JP2012/060003 on Apr. 12, 2012.

(30) Foreign Application Priority Data

Apr. 12, 2011 (JP) ................. 2011-087864
Jun. 19, 2013 (JP) ................. 2013-129076

(51) Int. Cl.
| B62D 33/03 | (2006.01) |
| E05D 11/08 | (2006.01) |
| F16F 9/14 | (2006.01) |
| B60J 5/04 | (2006.01) |
| B60J 5/10 | (2006.01) |
| E05F 5/02 | (2006.01) |

(52) U.S. Cl.
CPC .............. *E05D 11/082* (2013.01); *F16F 9/145* (2013.01); *B60J 5/047* (2013.01); *B60J 5/10* (2013.01); *E05F 5/025* (2013.01); *E05Y 2201/254* (2013.01); *E05Y 2201/266* (2013.01); *E05Y 2900/50* (2013.01)

(58) Field of Classification Search
USPC ................... 296/50, 146.11; 188/290; 16/319
See application file for complete search history.

(56) References Cited

U.S. PATENT DOCUMENTS

| 7,637,360 B2 * | 12/2009 | Carlson et al. ............. 188/267.2 |
| 7,673,929 B2 * | 3/2010 | Patzer et al. ............. 296/146.11 |
| 7,850,219 B2 * | 12/2010 | Townson et al. ................ 296/50 |
| 8,020,918 B2 * | 9/2011 | Patzer et al. ............. 296/146.11 |
| 2007/0023244 A1 * | 2/2007 | Carlson et al. ................ 188/267 |
| 2009/0139057 A1 | 6/2009 | Honda et al. .................... 16/343 |
| 2010/0122881 A1 * | 5/2010 | Carlson et al. ................ 188/267 |

FOREIGN PATENT DOCUMENTS

| JP | 2004183888 | 7/2004 |
| JP | 2007063884 | 3/2007 |
| JP | 2008082462 | 4/2008 |

\* cited by examiner

*Primary Examiner* — Lori L Lyjak
(74) *Attorney, Agent, or Firm* — Michael Tobias

(57) ABSTRACT

A rotary damper has a cylindrical housing. A rotor is rotatably supported inside the housing for rotation with respect to the housing by a first bearing and a second bearing. The second bearing has a greater length in the axial direction of the rotor than the first bearing. The rotary damper can be employed in an opening and closing mechanism for a vehicle door.

10 Claims, 15 Drawing Sheets

ROTARY DAMPER AND OPENING AND CLOSING MECHANISM FOR A VEHICLE DOOR

REFERENCE TO RELATED APPLICATIONS

This application is a continuation-in-part of application Ser. No. 14/110,563, the disclosure of which is incorporated by reference, which is the National Stage of International Application No. PCT/JP2012/060003 filed on Apr. 12, 2012, the disclosure of which is incorporated by reference. This application also incorporates by reference the disclosure of Japanese Application No. JP 2013-129076, filed on Jun. 19, 2013.

BACKGROUND OF THE INVENTION

1. Field of the Invention

This invention relates to a rotary damper and an opening and closing mechanism for a vehicle door employing the rotary damper.

2. Related Art

Vehicle doors which open and close with respect to a vehicle body, such as tailgates of automobiles, are commonly equipped with a rotary damper in order to enable the vehicle door to open and close smoothly. A rotary damper applies rotational resistance to a member which undergoes rotational movement and attenuates the rotational movement. It typically includes a rotor which is connected to a member which undergoes rotational movement. The rotor rotates while resisting a mechanical frictional force or fluid resistance produced by a fluid such as oil. For example, JP 2007-63884 A (corresponding to US 2009/0139057 A1) discloses a rotary damper which is mounted on the bottom surface of a tailgate of a vehicle and which is connected to a shaft which rotates relative to the tailgate as the tailgate opens and closes.

In the rotary damper disclosed in JP 2007-63884 A, the rotary damper and the rotating shaft are respectively secured to the vehicle body and to the tailgate which rotates with respect to the vehicle body. As a result, when the tailgate is opened and closed, if there is a deviation in the position or attitude of the rotary damper with respect to the rotating shaft, there were the problems that the durability of the rotary damper decreased or the resistance to rotation generated by the damper varied.

SUMMARY OF THE INVENTION

The present invention was made in order to overcome the above-described problems, and its object is to provide a rotary damper and an opening and closing mechanism for a vehicle door which has increased durability and little variation in the resistance to rotation which is generated by the rotary damper.

According to one form of the present invention, a rotary damper includes a housing having a first lengthwise end with a connecting portion for connecting the housing to a hinge and a second lengthwise end, a rotor rotatably disposed inside the housing, a fluid sealed inside the housing surrounding the rotor, a first bearing rotatably supporting the rotor for rotation with respect to the housing at the first lengthwise end of the housing, and a second bearing rotatably supporting the rotor for rotation with respect to the housing at the second lengthwise end of the housing and having a length in an axial direction of the rotor which is greater than a length of the first bearing in the axial direction of the rotor.

When an external force tending to produce a deviation of the position or the attitude of the rotor with respect to the housing is applied to the rotary damper, the force acting on the second bearing is typically greater than the force acting on the first bearing. By making the second bearing longer than the first bearing, the area of contact between the second bearing and the rotor is made greater than the area of contact between the first bearing and the rotor, and the second bearing can strongly support the rotor against forces applied to it. As a result, even when an external force which tends to produce a deviation of the position or attitude of the rotor with respect to the housing is applied to the rotary damper, deformation or damage of the portions of the rotary damper in the periphery of the rotor which support the rotor is prevented, and rotation of the rotor can be stably maintained. In addition, the durability of the rotary damper can be increased, and variations in the resistance to rotation generated by the rotary damper can be suppressed. Furthermore, compared to when the length of the first bearing is increased in order to provide stronger support for the rotor, it is possible to increase durability and suppress variations in resistance to rotation without decreasing the volume of the housing containing the fluid.

The length of the second bearing in the axial direction of the rotor is preferably 1.5-10 times the length of the first bearing, more preferably 1.5-5 times the length of the first bearing, and still more preferably 1.5-3 times the length of the first bearing. By making the second bearing longer than the first bearing, it is possible to effectively increase durability and suppress variations in resistance to rotation compared to an arrangement in which the first and second bearings have substantially the same length.

According to one embodiment, the second end of the housing has a bottom surface which closes off the second end and a projection which extends from the bottom surface towards the first end, the rotor has a recess which rotatably receives the projection, and a top surface of the projection contacts a bottom surface of the recess.

With this arrangement, because the top surface of the projection contacts the bottom surface of the recess, even when an external force which produces a deviation of position or attitude of the rotor with respect to the housing is applied to the rotary damper, the rotor can be supported with certainty. Therefore, deformation of and damage to the rotor and structure in the periphery of the rotor for supporting the rotor are prevented and stable rotation can be maintained.

According to another embodiment, a gap is provided between the top surface of the projection and the bottom surface of the recess. In this embodiment, there is less resistance to relative rotation of the rotor and the housing compared to the embodiment in which the top surface of the projection contacts the bottom surface of the recess even when an external force producing deviation of the position or the attitude of the rotor with respect to the housing is applied to the rotary damper. In addition, the manufacturing accuracy required of the housing and the rotor is decreased, so manufacture becomes easier.

The present invention also provides an opening and closing mechanism for a vehicle door employing a rotary damper according to the present invention.

Specifically, according to another aspect of the present invention, an opening and closing mechanism for a vehicle door comprises a rotary damper according to the present invention and a hinge having a first hinge portion for connection to a vehicle door, a second hinge portion for connection to a vehicle body and rotatable about a rotational axis with respect to the first hinge portion to enable opening and closing of the vehicle door with respect to the vehicle body, and a shaft having an axis coinciding with the rotational axis of the hinge. The shaft is secured to the rotor of the rotary damper and to one of the first and second hinge portions, and the housing is secured to the other of the first and second hinge portions. The rotary damper has first and second bearings for the rotor of the rotary damper. The length of the second bearing in the axial direction of the rotor is greater than the length of the first bearing in the axial direction of the rotor and is preferably 1.5-10 times the length of the first bearing in the axial direction of the rotor.

BRIEF DESCRIPTION OF THE DRAWINGS

FIGS. 1(A)-1(D) schematically show the overall structure of a first embodiment of a rotary damper according to the present invention, wherein FIG. 1(A) is a plan view of the rotary damper from which a plug has been removed, FIG. 1(B) is a cross-sectional view taken along line A-A of FIG. 1(A), FIG. 1(C) is a cross-sectional view taken along line B-B of FIG. 1(A), and FIG. 1(D) is a cross-sectional view taken along line C-C of FIG. 1(A).

FIGS. 2(A) and 2(B) schematically show the overall structure of an opening and closing mechanism for a vehicle door employing the rotary damper shown in FIGS. 1(A)-1(D), wherein FIG. 2(A) is a side elevation showing a state in which a tailgate is closed, and FIG. 2(B) is a side elevation showing a state in which the tailgate is open.

FIGS. 4(A) and 4(B) schematically show the overall structure of another embodiment of an opening and closing mechanism for a vehicle door, wherein FIG. 4(A) is a side elevation showing the state in which a tailgate is closed, and FIG. 4(B) is a side elevation showing the state in which the tailgate is open.

FIGS. 7(A) and 7(B) are plan views schematically showing another embodiment of a rotary damper according to the present invention with a plug removed for clarity, wherein FIG. 7(A) shows a stationary state of the rotary damper, and FIG. 7(B) shows a state when the rotor is undergoing rotation relative to the housing of the rotary damper.

FIGS. 8(A) and 8(B) schematically show the overall structure of another embodiment of a rotary damper according to the present invention, wherein FIG. 8(A) is a plan view of the embodiment with a plug omitted for clarity, and FIG. 8(B) is a cross-sectional view taken along line F-F of FIG. 8(A).

DESCRIPTION OF PREFERRED EMBODIMENTS

Below, a number of embodiments of a rotary damper and an opening and closing mechanism for a vehicle door according to the present invention will be described while referring to the accompanying drawings.

Figure 1A:
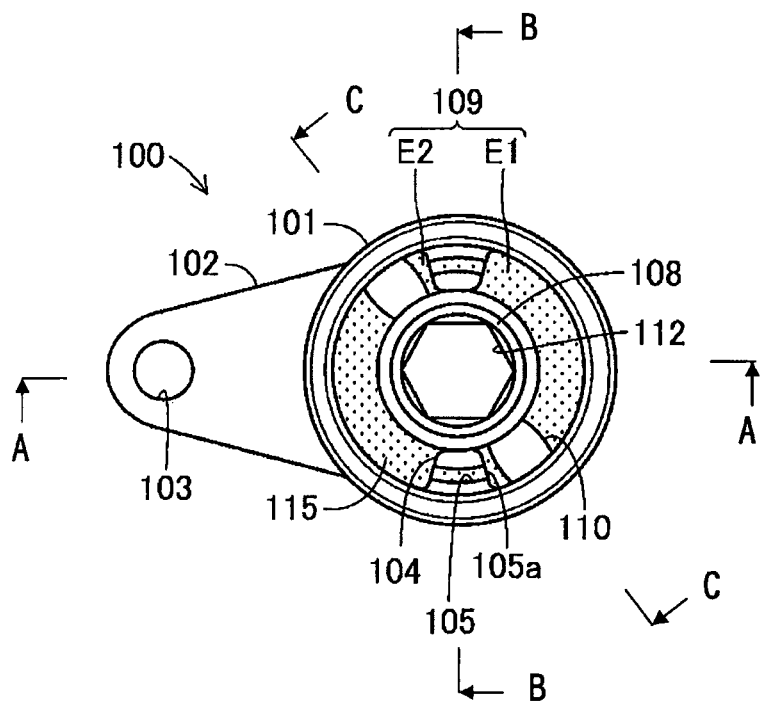
Figure 1B:
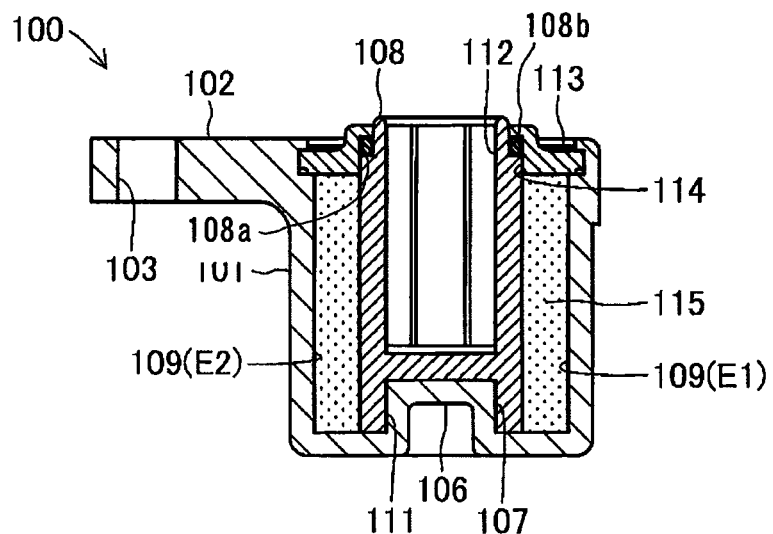
Figure 1C:
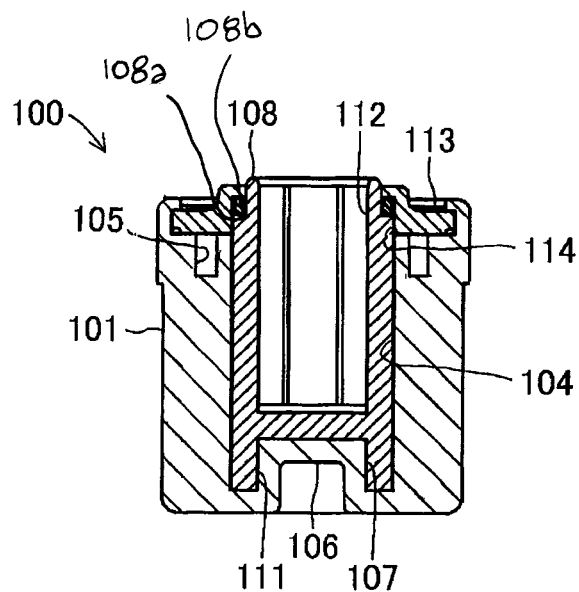
Figure 1D:
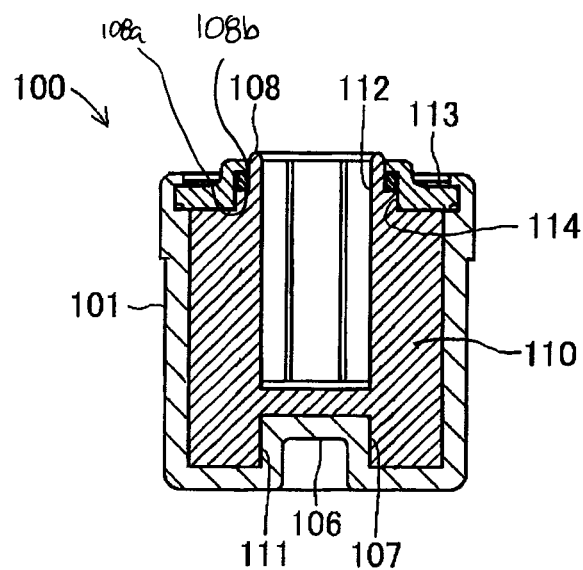

FIGS. 1(A)-1(D) schematically show the overall structure of a first embodiment of a rotary damper 100 according to the present invention. FIG. 1(A) is a plan view of the rotary damper 100, FIG. 1(B) is a cross-sectional view taken along line A-A in FIG. 1(A), FIG. 1(C) is a cross-sectional view taken along line B-B in FIG. 1(A), and FIG. 1(D) is a cross-sectional view taken along line C-C in FIG. 1(A). In FIG. 1(A), a plug 113 of the rotary damper 100 has been omitted in order to make it possible to view the structure inside the rotary damper 100. Each of the drawings referred to in this description has portions which are shown schematically, such as in an exaggerated manner, so as to facilitate an understanding of the present invention. Therefore, the dimensions, dimensional ratios, etc. of the components may differ from the actual dimensions, dimensional ratios, etc.

The rotary damper 100 is a mechanical apparatus for providing smooth rotation of two members which are movably connected to each other, such as a tailgate or other type of vehicle door which opens and closes with respect to the body of a vehicle such as an automobile.

This embodiment of a rotary damper 100 includes a housing 101 and a rotor 108 rotatably supported by the housing 101 for rotation with respect to the housing 101. The housing 101 is a generally cylindrical member having a first end (the upper end in FIG. 1(B)) and a second end (the lower end in FIG. 1(B)). The first end of the housing 101 has an opening, while the second end has a bottom which closes off the second end. A flange 102, which is a connecting portion for connecting the rotary damper 100 to one of two members (not shown) on which the rotary damper 100 is to be mounted, extends radially outwards from the first end of the housing 101. As viewed in plan, the flange 102 in this embodiment has a roughly triangular shape with a width which decreases from the outer periphery of the housing 101 towards the radially outer end of the flange 102. An installation through hole 103 which is used when connecting the housing 101 to another member is formed on the radially outer end of the flange 102 and has an axis extending parallel to the axial direction of the housing 101. The housing 101 can be formed from a variety of materials. For example, in the present embodiment, it is formed by injection molding of zinc.

The housing 101 has a cylindrical inner peripheral surface. Two diametrically opposed housing vanes 104 are formed on and project radially inwards from the inner peripheral surface of the housing 101. The housing vanes 104 are wall-shaped members which extend in the axial direction of the housing 101 from the bottom inner surface of the housing 101 to the lower surface of the plug 113. Together with the rotor 108, the housing vanes 104 partition the interior of the housing 101 into first and second chambers E1 and E2. The radially inner surface of each housing vane 104 is formed in the shape of an arc extending along the radially outer surface of the rotor 108. A fluid channel 105 which extends in the circumferential direction of the housing 101 is formed in the upper end of each housing vane 104 and has an opening 105a at each of its lengthwise ends where the fluid channel 105 fluidly communicates with one of the two chambers E1 and E2.

In this embodiment, each fluid channel 105 is a groove which fluidly connects the first region E1 and the second region E2 formed on opposite sides of the housing vanes 104 and limits the flow rate of a fluid 115 between the two regions. The transverse cross-sectional area of the fluid channels 105, which determines the flow rate of the fluid 115 through the fluid channels 105, is suitably set in accordance with the size of the load (the torque) to be applied to the rotary damper 100 during an opening and closing operation of a vehicle door.

A support projection 106 for rotatably supporting the rotor 108 is formed on the bottom of the interior of the housing 101. The support projection 106 has a cylindrical outer peripheral surface and a flat upper surface. The support projection 106 projects in the axial direction of the housing 101 from the center of the bottom of the housing 101. In this embodiment, the outer peripheral surface of the support projection 106 serves as a second bearing 107 which fits into a recess 111 formed in the lower end of the rotor 108 so that the rotor 108 can slidably rotate with respect to the support projection 106. The distance by which the support projection 106 projects from the bottom inner surface of the housing 101 to the top of the support projection 106, i.e., the length of the second bearing 107 in the axial direction of the housing 101 is selected to be greater than the length of the below-described first bearing 114. In this embodiment, the length of the second bearing 107 is two times the length of the first bearing 114.

The rotor 108 is a generally cylindrical member which is open at its first end (the upper end in FIG. 1(B)) and is closed off by a bottom near its second end (the lower end in FIG. 1(B)) above the recess 111. The rotor 108 can be formed of a variety of materials. For example, in this embodiment, it is formed by injection molding of zinc. Over a portion of its outer periphery, the rotor 108 has a cylindrical surface which slidably contacts the radially inner surfaces of the two housing vanes 104. An annular space is formed between the inner peripheral surface of the housing 101 and the outer peripheral surface of the rotor 108 to define an inner chamber 109 comprising the first region E1 and the second region E2 which are separated from each other by the housing vanes 104. The rotor 108 also includes two diametrically opposed rotor vanes 110 which extend radially outwards from the cylindrical portion of the rotor 108.

The rotor vanes 110 are wall-shaped members which can be rotatably displaced with respect to the housing 101 in the first and second regions E1 and E2 when the rotor 108 and the housing 101 undergo relative rotation. As shown in FIG. 1(D), each rotor vane 110 extends in the axial direction of the rotor 108 between the bottom inner surface of the housing 101 and the lower surface of the plug 113. The radially outer ends of the rotor vanes 110 are formed in the shape of a circular arc extending along the cylindrical inner peripheral surface of the housing 101 and are in sliding contact with the inner peripheral surface of the housing 101 when the rotor 108 and the housing 101 undergo relative rotation.

In the present embodiment, the housing vanes 104 are integrally formed with the cylindrical outer portion of the housing 101, and the rotor vanes 110 are integrally formed with the cylindrical inner portion of the rotor 108. However, the housing vanes 104 and the rotor vanes 110 need not be integrally formed with the outer portion of the housing 101 or the inner portion of the rotor 108, respectively. In addition, the housing vanes 104 and the rotor vanes 109 are not restricted to the shapes shown in FIGS. 1(A)-1(D). For example, housing vanes and rotor vanes like those disclosed in WO 2012/141242 A1 or WO 2012/141243 A1 can instead be used.

The recess 111 in the lower end of the rotor 108 has a cylindrical inner periphery. The recess 111 receives the support projection 106 of the housing 101 so that the recess 111 and the support projection 106 can slidably rotate with respect to each other. In this embodiment, the depth of the recess 111 in the axial direction of the rotor 108 is selected so that the bottom surface of the recess 111 slidably contacts the top surface of the support projection 106 when the rotor 108 and the housing 101 undergo relative rotation.

A connecting portion in the form of a bore 112 for connecting the rotor 108 to another member is formed inside the rotor 108. The shape of the bore 112 is selected so that the bore 112 can mate with a below-described shaft 209. In this embodiment, the bore 112 has a hexagonal transverse cross-sectional shape over at least a portion of its length.

The upper end of the rotor 108 in FIG. 1(B) is rotatably supported by the plug 113. The plug 113 is a flat ring which seals the upper end of the inner chamber 109 of the housing 101 in a liquid-tight and gas-tight manner. The plug 113 has a bore at its center which surrounds the upper end of the rotor 108. As shown in FIG. 1(C), the plug 113 sealingly contacts the upper ends of the housing vanes 104 so as to prevent fluid from leaking out of the upper ends of the fluid channels 105. A ledge 108a is formed on the outer periphery of the rotor 108 near its upper end, and a sealing ring 108b is mounted on the ledge 108a to form a liquid-tight and gas-tight seal between the rotor 108 and the bore of the plug 113. The inner peripheral surface of the lower portion of the bore of the plug 113 (the portion of the bore extending from the lower end of the bore to the lower end of the ledge 108a on which the sealing ring 108b is mounted) defines a first bearing 114 which interfits with the upper end of the rotor 108 so that the upper end of the rotor 108 can slidably rotate with respect to the first bearing 114. In the upper portion of the plug 113 above the sealing ring 108b, the inner peripheral surface of the bore of the plug 113 is spaced from the outer peripheral surface of the rotor 108 by a gap, so the upper portion of the bore of the plug 113 does not act to rotatably support the rotor 108. The length of the first bearing 114 in the axial direction of the housing 101 is thus the axial length from the lower end of the bore of the plug 113 to the lower end of the ledge 108a supporting the sealing ring 108b. The outer peripheral portion of the plug 113 is secured to the upper end of the housing 101 in a fluid-tight and gas-tight manner by crimping of the upper end of the housing 101.

The fluid 115 is sealed inside the inner chamber 109. The fluid 115 is a material which performs a damping function by imparting resistance to the rotor vanes 110 when they undergo rotational displacement with respect to the housing 101 inside the first and second regions E1 and E2 inside the inner chamber 109. The fluid 115 may be in a variety of forms, such as a liquid, a gel, or a semisolid substance having a viscosity corresponding to the desired properties of the rotary damper 100. In this embodiment, the fluid 115 comprises an oil such as silicone oil.

Figure 2A:
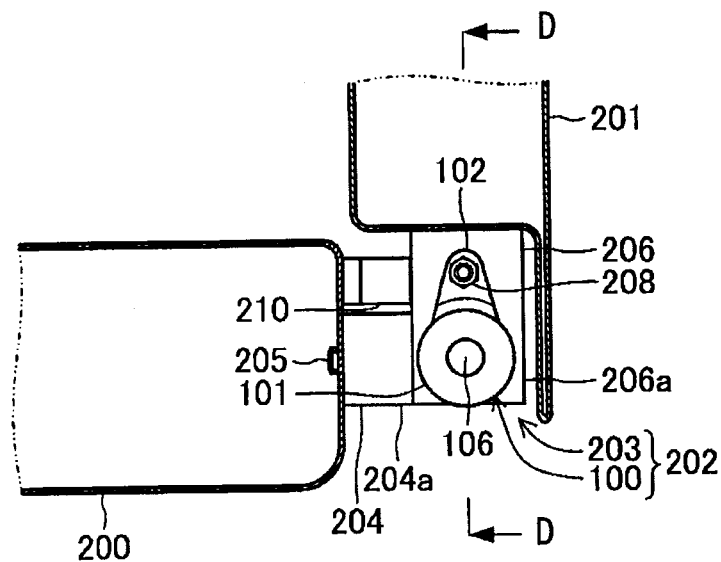
Figure 2B:
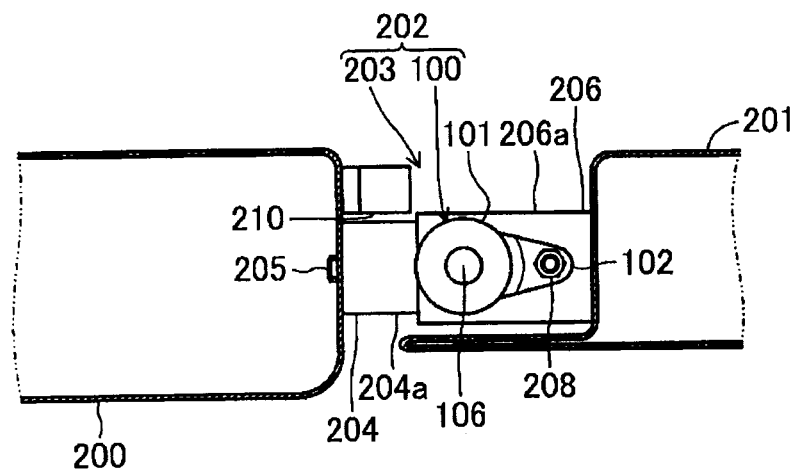
Figure 3:
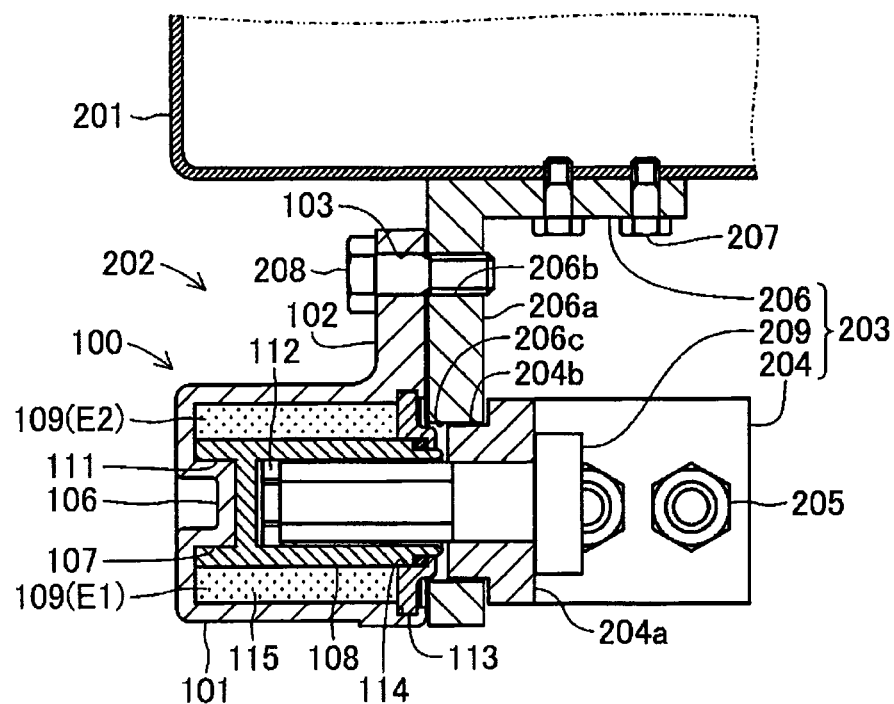
FIG. 3 is a cross-sectional view of the opening and closing mechanism for a vehicle door of FIG. 2(A) taken along line D-D of FIG. 2(A).

The rotary damper 100 is normally installed between two members which are rotatably connected to each other. For example, as shown in FIGS. 2(A) and 2(B) and FIG. 3, the rotary damper 100 can be used as a portion of an opening and closing mechanism 202 which movably supports a plate-like tailgate 201 with respect to the cargo area 200 of a vehicle such as an automobile. The opening and closing mechanism 202 enables the tailgate 201 to pivot between an upright position shown in FIG. 2(A) (which is typically a closed position of the tailgate 201) and a horizontal position shown in FIG. 2(B) (which is typically an open position of the tailgate 201). The illustrated open and closing mechanism 202 comprises a hinge 203 and the rotary damper 100 of FIGS. 1(A)-1(D).

In FIGS. 2(A) and 2(B), the rotational axis of the hinge 203 is horizontal, and the tailgate 201 rotates in the clockwise direction from its closed position in FIG. 2(A) to its open position in FIG. 2(B). However, there is no restriction on the orientation of the rotational axis of the hinge 203 or on the rotational direction of the tailgate 201 or other vehicle door from its closed to its open position.

The hinge 203 pivotably connects the tailgate 201 to the cargo area 200. It includes a fixed bracket 204 which is secured to the cargo area 200, a movable bracket 206 which is secured to the tailgate 201, and a shaft 209. The fixed bracket 204 supports the movable bracket 206 for rotation with respect to the fixed bracket 204 about the longitudinal axis of the shaft 209. The fixed bracket 204 is a generally L-shaped member made of steel, for example. One portion of the fixed bracket 204 is secured to the cargo area 200 by bolts 205. A projecting portion 204a of the fixed bracket 204 projects from the rear end of the cargo area 200 in the rearward direction of the vehicle. A boss 204b having a cylindrical outer periphery is formed on the projecting portion 204a and projects perpendicularly from it. The boss 204b pivotably supports the movable bracket 206. A through hole for receiving the shaft 209 passes through the thickness of the projecting portion 204a.

The movable bracket 206 of the hinge 203 is also an L-shaped member made of steel, for example. As shown in FIG. 3, it includes a portion which is secured to the tailgate 201 by bolts 207 and a projecting portion 206a which projects perpendicularly from the tailgate 201.

An installation screw hole 206b is formed in the projecting portion 206a. The installation screw hole 206b has female threads for receiving a bolt 208 which passes through the through hole 103 in the flange 102 of the housing 101 of the rotary damper 100 and threadingly engages with the screw hole 206b to secure the housing 101 to the movable bracket 206 of the hinge 203.

Another through hole 206c for receiving the boss 204b passes through the thickness of the projecting portion 206a of the movable bracket 206. The boss 204b of the fixed bracket 204 interfits with one side of the hole 206c so as to be able to slidably rotate within the hole 206c. The other side of the hole 206c has an inner diameter into which the plug 113 and the first end of the rotor 108 of the rotary damper 100 can fit.

The shaft 209 secures the rotor 108 to the fixed bracket 204 so as to prevent the rotor 108 from rotating with respect to the fixed bracket 204. In the present embodiment, the shaft 209 is a pin-shaped member made of steel, for example. One end of the shaft 209 (the right end in FIG. 3) has a flange which is secured to the projecting portion 204a of the fixed bracket 204 by an unillustrated bolt. The other end of the shaft 209 (the left end in FIG. 3) has a hexagonal outer periphery which matches the hexagonal inner periphery of the bore 112 of the rotor 108 so that the shaft 209 can interfit with the bore 112 without rotating with respect to the rotor 108. With this arrangement, when the tailgate 201 rotates with respect to the cargo area 200, the rotary damper 100 applies rotational resistance to the opening and closing mechanism 202. As shown in FIG. 2(A), a stopper 210 which limits the inclination of the tailgate 201 towards the cargo area 200 is mounted on the rear end of the cargo area 200.

Although FIGS. 2(A), 2(B), and 3 show only a single hinge 203, a tailgate for an automobile will typically be connected to the vehicle body by multiple hinges. For example, the illustrated tailgate 201 may be equipped with one or more additional hinges which rotatably connect the tailgate 201 to the cargo area 200 at one or more locations spaced from the illustrated hinge 203 in the widthwise direction of the vehicle body. The one or more additional hinges may have the same structure as the illustrated hinge 203 and may each include a rotary damper 100 according to the present invention, or they may have a different structure from the illustrated hinge 203.

The operation of this embodiment of a rotary damper 100 will next be explained. When the tailgate 201 is opened or closed, because the housing 101 of the rotary damper 100 is secured to the movable bracket 206 and the rotor 108 is secured by the shaft 209 to the fixed bracket 204, the rotor 108 remains stationary and the housing 101 rotates with respect to the rotor 108 around the axis of the rotor 108.

This relative rotation of the housing 101 and the rotor 108 causes the housing vanes 104 inside the inner chamber 109 of the housing 101 to be rotationally displaced with respect to the rotor vanes 110 in the rotational direction of the housing 101 and the rotational displacement of the housing vanes 104 forces the fluid 115 through the fluid channels 105 in the housing vanes 104. As the fluid 115 in the inner chamber 109 flows through the fluid channels 105 of the housing vanes 104 between the first and second regions E1 and E2, the fluid resistance produced by the flow channels 105 generates a reaction force which resists the relative rotation of the housing 101 and the rotor 108. As a result, the rotary damper 100 imparts rotational resistance to rotation of the movable bracket 206 with respect to the fixed bracket 204, and the tailgate 201 can be slowly rotated between its open and closed positions.

An external force is sometimes applied to the rotary damper in a direction transverse to the axial direction of the rotor 108 due to an external force being imparted to the cargo area 200 or the tailgate 201. Such an external force can tend to produce a deviation in the position or attitude of the rotor 108 with respect to the housing 101. One end of the rotor 108 is supported by the first bearing 114 so as to be able to slidably rotate, and the other end of the rotor 108 is supported by the second bearing 107 so as to be able to slidably rotate. A larger external force producing a deviation in the position or attitude of the rotor 108 is typically applied to the second bearing 107 than to the first bearing 114. Because the second bearing 107 is longer in the axial direction of the rotor 108 than the first bearing 114, the area of contact between the second bearing 107 and the rotor 108 is larger than the area of contact between the first bearing 114 and the rotor 108. As a result, the rotary damper 100 can stably support the rotor 108. Therefore, deviation of the position or attitude of the rotor 108 with respect to the housing 101 and deformation of or damage to the housing 101, the rotor 108, or the plug 113 are prevented. In addition, stable rotation of the rotor 108 with respect to the housing 101 can be guaranteed.

As can be understood from the above-described explanation of the method of operation, according to the above-described embodiment, the rotary damper 100 has a first bearing 114 which rotatably supports the outer peripheral surface of one end of the rotor 108 and a second bearing 107 which rotatably supports the inner peripheral surface of the other end of the rotor 108. The second bearing 107 has a greater length in the axial direction of the rotor 108 than the first bearing 114. Namely, of the first bearing 114 and the second bearing 107 which rotatably support the rotor 108 of the rotary damper 100, the second bearing 107 which supports the end of the rotor 108 to which is applied a greater external force producing a deviation of the position or attitude of the rotor 108 is formed with a larger surface area than the first bearing 114. As a result, even when an external force producing a deviation in the relative position or attitude of the shaft 209 with respect to the rotor 108 is applied, deformation or damage of the rotor 108 is prevented and stable rotation of the rotor 108 can be maintained, durability can be increased, and variations in resistance to rotation generated by the rotary damper 100 can be suppressed. In addition, compared to the case in which the length of the first bearing 114 is increased, durability can be increased and variations in rotational resistance can be suppressed without decreasing the volume of the inner chamber 109 which houses the fluid 115.

The present invention is not limited to the above-described embodiment, and numerous modifications of the present invention are possible. In the following description of additional embodiments, components which are the same as or correspond to components in the above-described embodiment are referred to by the same reference numbers, and an explanation of those components will be omitted.

Figure 4A:
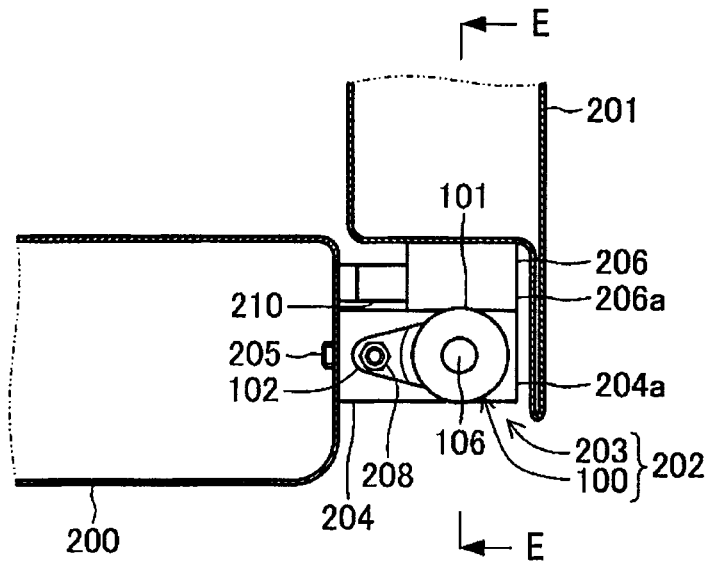
Figure 4B:
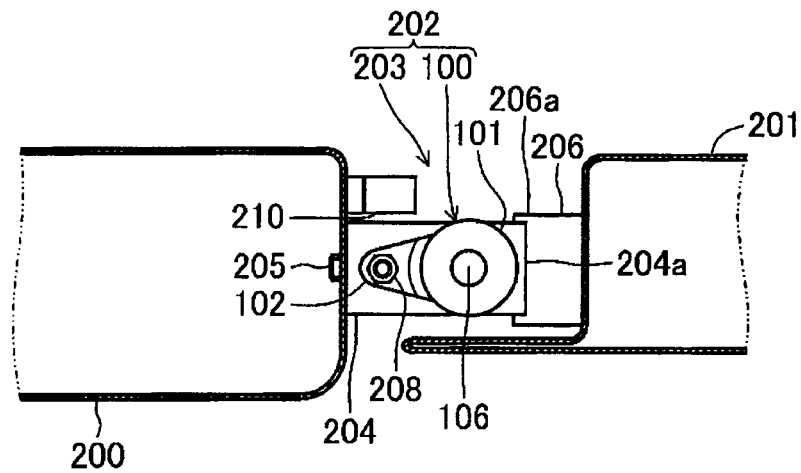
Figure 5:
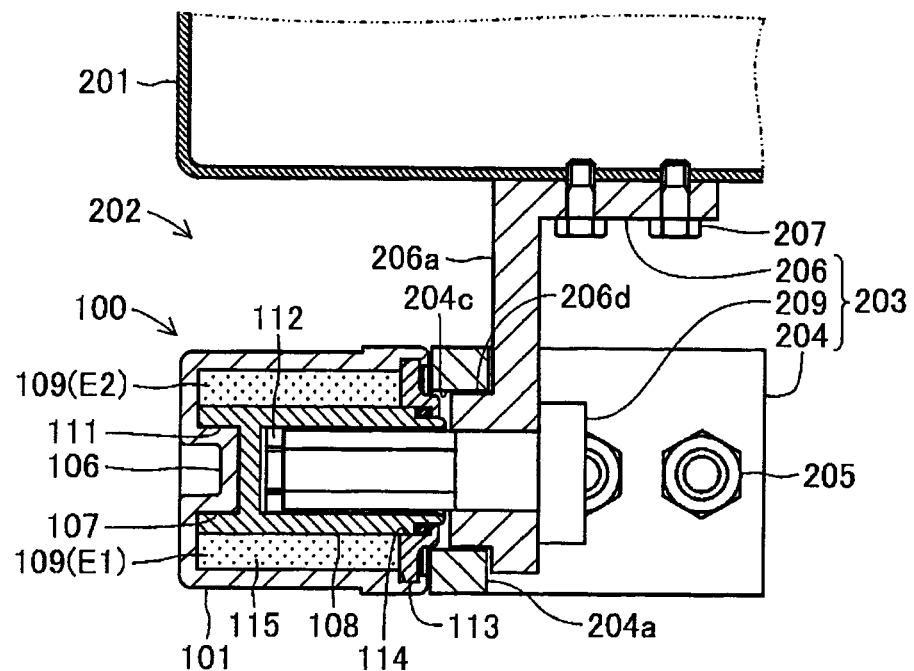
FIG. 5 is a cross-sectional view of the opening and closing mechanism for a vehicle door of FIG. 4(A) taken along line E-E of FIG. 4(A).

In the above-described embodiment, the housing 101 of the rotary damper 100 is secured to the tailgate 201 through the movable bracket 206, and the rotor 108 is secured to the cargo area 200 through the shaft 209 and the fixed bracket 204. FIGS. 4(A), 4(B), and 5 illustrate another embodiment in which the housing 101 is secured to the cargo area 200 instead of to the tailgate 201, and the rotor 108 is secured to the tailgate 201 instead of to the cargo area 200. As shown in these figures, in this embodiment, the housing 101 is secured to the fixed bracket 204, and the rotor 108 is secured to the movable bracket 206.

In this embodiment, a boss 206d corresponding to the boss 204b in FIG. 3 is formed on the projecting portion 206a of the movable bracket 206, and a hole 204c corresponding to hole 206c in FIG. 3 is formed in the projecting portion 204a of the fixed bracket 204. The hole 204c has an inner diameter such that the boss 206d can rotate inside the hole 204c. An installation screw hole (not shown) corresponding to the installation screw hole 206b of FIG. 3 is formed in the projecting portion 204a of the fixed bracket 204, and the flange 102 of the housing 101 is secured to the fixed bracket 204 by a bolt 208 which is screwed into the installation screw hole. In this embodiment, when the tailgate 201 is opened or closed with respect to the cargo area 200 by rotating the movable bracket 206 with respect to the fixed bracket 204 about the axis of the shaft 209, the housing 101 remains stationary because it is secured to the fixed bracket 204 while the rotor 108 rotates with respect to the housing 101 about its axis together with the movable bracket 206 and the tailgate 201. The relative rotation of the housing 101 and the rotor 108 is resisted by the fluid resistance provided by the fluid 115 inside the housing 101 in the same manner as in the first embodiment, and the rotary damper 100 produces a damping action which enables the tailgate 201 to smoothly rotate with respect to the cargo area 200.

In the embodiment shown in FIGS. 1(A)-1(D), the length of the second bearing 107 in the axial direction of the rotor 108 is set to be two times the length of the first bearing 114 in the axial direction of the rotor 108. However, the second bearing 107 need not be twice the length of the first bearing 114, and it is sufficient for the length of the second bearing 107 in the axial direction to be longer than the length of the first bearing 114 in the axial direction. According to experiments by the present inventors, the length of the second bearing 107 in the axial direction of the rotor is preferably 1.5-10 times the length of the first bearing 114, more preferably 1.5-5 times the length of the first bearing 114, and still more preferably 1.5-3 times the length of the first bearing 114. In the case of a rotary damper 100 used in an opening and closing mechanism for a door such as a tailgate of a vehicle such as an automobile, it is preferable for the length of the second bearing 107 in the axial direction to be 5-10 millimeters.

Figure 6:
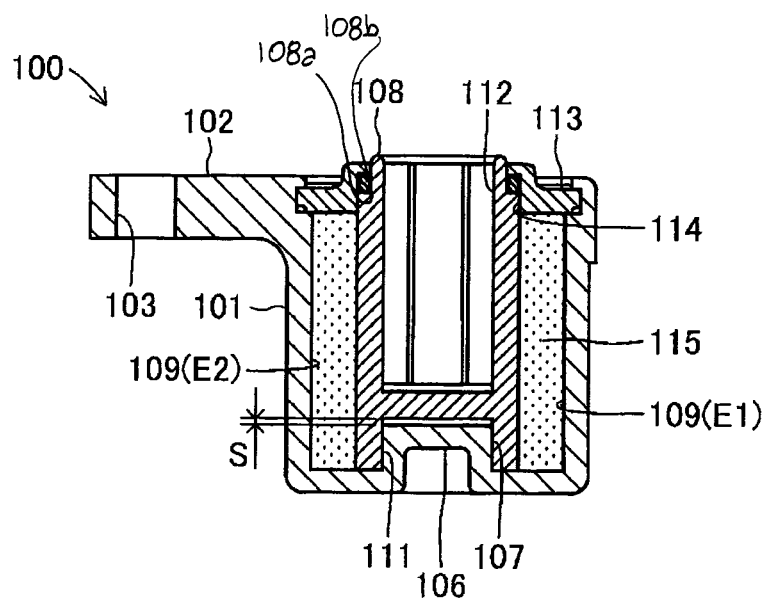
FIG. 6 is a longitudinal cross-sectional view of another embodiment of a rotary damper according to the present invention.

In the embodiment shown in FIGS. 1(A)-1(D), the lower end of the rotor 108 is rotatably supported by the second bearing 107 with the top surface of the support projection 106 contacting the bottom surface of the recess 111 in the lower end of the rotor 108. Due to this contact, even when an external force tending to produce a deviation in the position or attitude of the rotor 108 with respect to the housing 101 is applied, the rotor 108 is strongly supported by the second bearing 107, and deformation of or damage to structure in the periphery of the rotor 108 for supporting the rotor 108 can be prevented. However, it is not necessary for the top surface of the support projection 106 to contact the bottom surface of the recess 111. FIG. 6 is a longitudinal cross-sectional view of another embodiment of a rotary damper 100 in which a gap S is provided between the entire top surface of the support projection 106 and the bottom surface of the recess 111 in the rotor 108. Due to this gap S, the rotational resistance of the rotor 108 can be reduced compared to the embodiment shown in FIGS. 1(A)-1(D), and the rotor 108 can rotate under a small external force producing relative rotation of the housing 101 and the rotor 108, including when the external force produces a deviation of the position or attitude of the rotor 108 with respect to the housing 101. Furthermore, the manufacturing accuracy of the housing 101 and the rotor 108 can be reduced compared to the embodiment of FIGS. 1(A)-1(D), so manufacture becomes easier. This embodiment can be incorporated into an opening and closing mechanism for a door in the same manner as any of the preceding embodiments.

In the preceding embodiments, the rotary damper 100 is of the type which produces the same resistance to rotation of the rotor 108 with respect to the housing 101 regardless of the size of an external force applied to it. However, a rotary damper according to the present invention can instead be of the type which produces resistance to rotation of the rotor 108 with respect to the housing 101 which varies in accordance with the size of an external force applied to it. Such a rotary damper enables a tailgate 201 to be opened and closed at a constant speed regardless of the size of the external force acting on the tailgate 201.

Figure 7A:
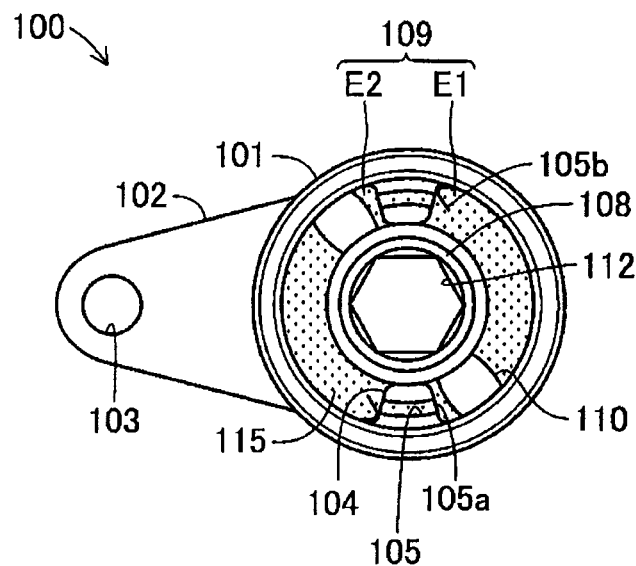
Figure 7B:
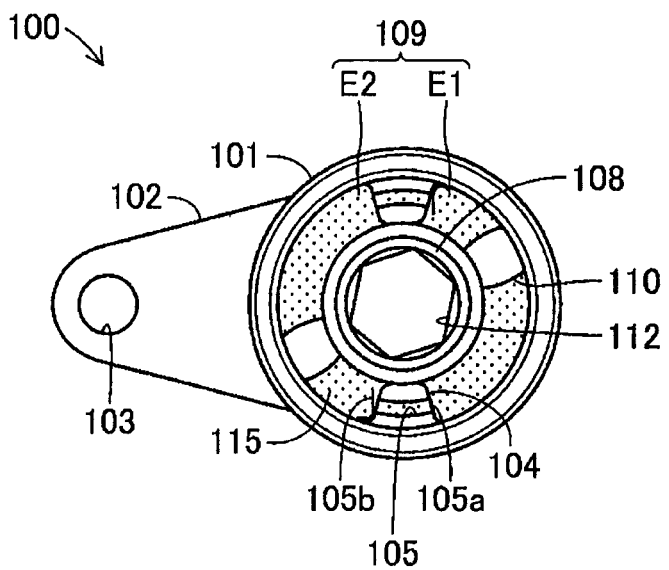

FIGS. 7(A) and 7(B) illustrate an embodiment of a rotary damper 100 according to the present invention which can adjust the resistance to rotation exerted by the rotary damper 100 in accordance with the speed and direction of relative rotation of the rotor 108 and the housing 101. A valve 105b such as a leaf spring is mounted on a side of each housing vane 104 in the vicinity of one of the openings 105a of the fluid channel 105 in the housing vane 104. Each valve 105b can bend between a maximally open position shown in FIG. 7(A) and a partially closed position shown in FIG. 7(B) in which it increases the resistance of fluid 115 flowing into the corresponding fluid channel 105 through the opening 105a. When the rotor 108 is stationary with respect to the housing 101 or when the rotor 108 is rotating in the clockwise direction in the figures with respect to the housing 101, the valves 105 are in their maximally open positions and provide little resistance to fluid flow. However, when the rotor 108 is rotated in the counterclockwise direction in the figures with respect to the housing 101, the valves 105b are moved towards their partially closed positions shown in FIG. 7(B) and partially constrict the flow of fluid 115 into the openings 105a to produce increased fluid resistance to rotation of the rotor 108 with respect to the housing 101. The greater the external force applied to the rotary damper 100 to produce relative rotation of the rotor 108 and the housing 101 in the counterclockwise direction in the figures, the greater is the resistance to rotation generated by the rotary damper 100.

Figure 8A:
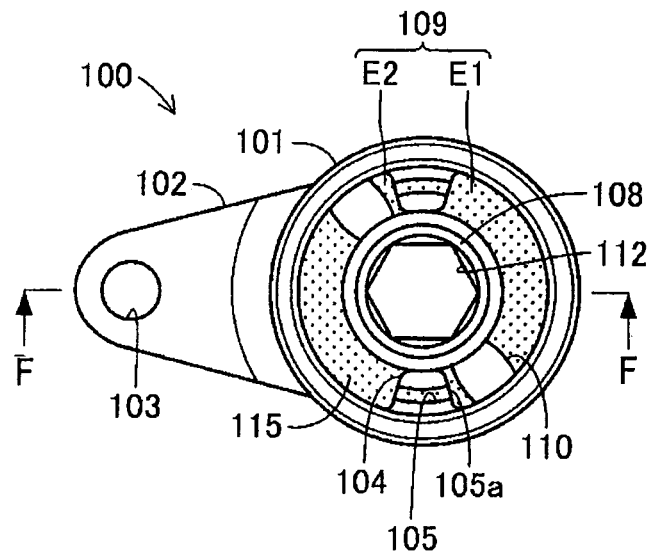
Figure 8B:
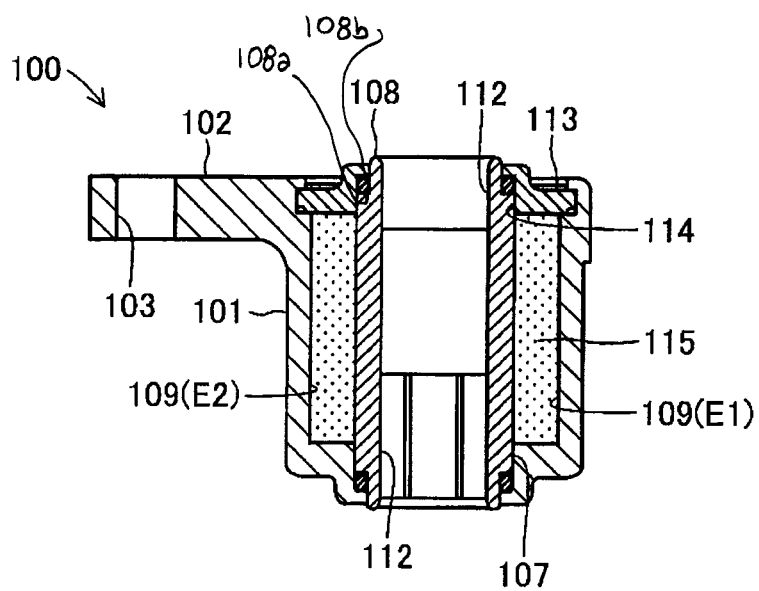
Figure 9:
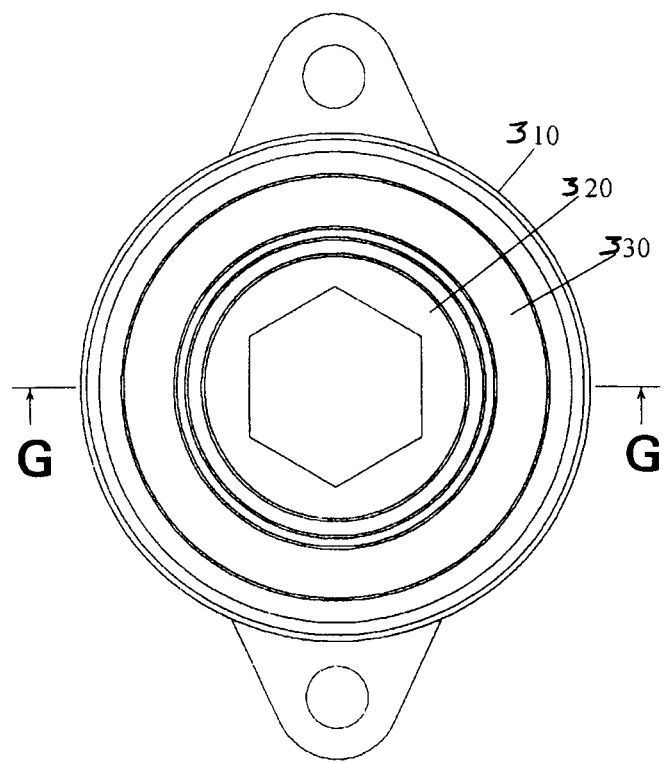
FIG. 9 is a plan view of another embodiment of a rotary damper according to the present invention.
Figure 10:
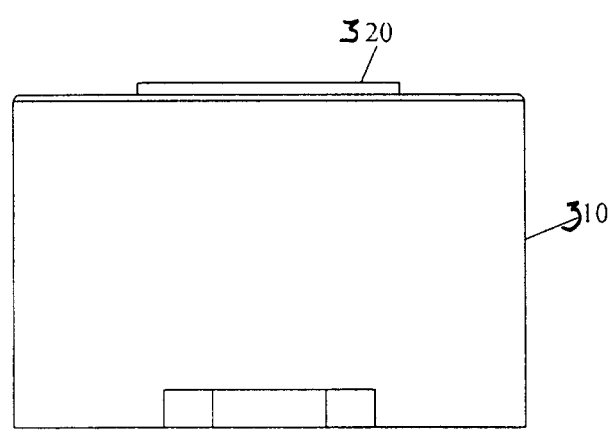
FIG. 10 is an elevation of the rotary damper of FIG. 9.

In the above-described embodiments, the housing 101 of the rotary damper 100 has a bottom surface which closes off the lower end of the housing 101. However, as shown in FIGS. 8(A) and 8(B), for example, the housing 101 may be open at both ends, and the support projection 106 of the housing 101 and the recess 111 in the rotor 108 may be omitted. In this embodiment, the second bearing 107 rotatably supports the outer peripheral surface of the rotor 108.

In the above-described embodiments, the bore 112 of the rotor 108 of the rotary damper 100 has a hexagonal portion which mates with a hexagonal portion of the shaft 209. However, the bore 112 need not have any particular shape as long as it enables the rotor 108 to be rigidly connected to the shaft 109. Accordingly, the bore 112 of the rotor 108 may be a cylindrical through hole. Alternatively, instead of the rotor 108 having a bore 112, it may have a shaft-shaped portion which interfits with a hole formed in the shaft 209. Thus, various arrangements can be employed to connect the rotor 108 to the shaft 209.

In the above-described embodiments, the rotor 108 is rotatably supported by the second bearing 107 which is formed in the housing 101 and the first bearing 114 which is formed in the plug 113. However, as long as the rotor 108 is rotatably supported at both ends by the first bearing 114 and the second bearing 107 so as to be able to slidably rotate, the bearings can have a structure different from that shown in the drawings. Accordingly, the first bearing 114 may be formed by the housing 101 itself (as is the case with the second bearing 107 in FIG. 1(B)), and the second bearing 107 may be formed by a member other than the housing 101 (as is the case with the first bearing 114 in FIG. 1(B)).

In the above-described embodiments, a rotary damper according to the present invention is incorporated into an opening and closing mechanism for a tailgate of a vehicle. However, a rotary damper according to the present invention can be used in an opening and closing mechanism for a vehicle door other than a tailgate, such as a vehicle door for passengers, and it can also be used in an opening and closing mechanism for a door other than a vehicle door. In addition, a rotary damper according to the present invention can be used in a mechanism which connects two members so as to be able to undergo relative rotation, such as a reclining mechanism for a seat. Such opening and closing mechanisms or rotational displacement mechanisms will include a shaft member corresponding to the shaft 209 which undergoes rotational displacement together with one of two members.

FIGS. 9 to 15 illustrate another embodiment of a rotary damper according to the present invention. As shown in these figures, the rotary damper includes a housing 310, a rotor 320, a plug 330, housing vanes 340, a viscous liquid, and rotor vanes.

Figure 11:
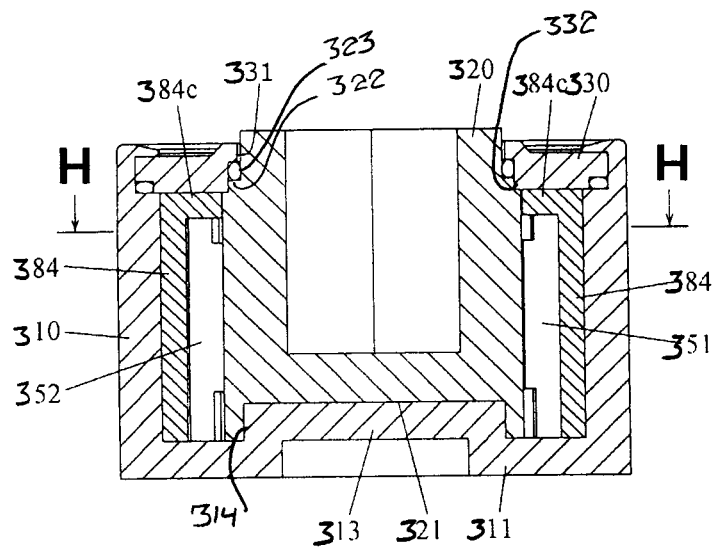
FIG. 11 is a cross-sectional view taken along line G-G in FIG. 9.

The housing 310 is open at one end and is completely closed at the other end by an end wall 311 (see FIG. 11). The housing 310 has a cylindrical peripheral wall 312 integral with the end wall 311, and is hollow (see FIGS. 11 and 12). A support projection 313 for rotatably supporting the rotor 320 projects in the axial direction of the housing 310 from the center of the end wall 311. The support projection 313 has a cylindrical outer peripheral surface and a flat upper surface. The outer peripheral surface of the support projection 313 serves as a second bearing 314 which rotatably supports the lower end of the rotor 320 and fits into a recess 321 formed in the lower end of the rotor 320 so that the rotor 320 can slidably rotate with respect to the support projection 313. Although the second bearing 314 in this embodiment is formed on the outer peripheral surface of the support projection 313, it is also possible for the second bearing 314 to be the inner peripheral surface of a recess which receives and rotatably supports a projection formed on the lower end of the rotor 320.

As shown in FIG. 11, the plug 330 closes the opening at one end of the housing 310 and is attached to the housing 310 by crimping the end of the peripheral wall 312 of the housing 310. The plug 330 rotatably supports the upper end of the rotor 320. The plug 330 has a bore 331 at its center which surrounds the upper end of the rotor 320. A ledge 322 is formed on the outer periphery of the rotor 320 near its upper end, and a sealing ring 323 is mounted on the ledge 322 to form a liquid-tight and gas-tight seal between the rotor 320 and the bore 331 of the plug 330. The inner peripheral surface of the lower portion of the bore 331 of the plug 330 (the portion of the bore extending from the lower end of the bore 331 to the lower end of the ledge 322 on which the sealing ring 323 is mounted) defines a first bearing 332 which rotatably supports the upper end of the rotor 320 so that the upper end of the rotor 320 can slidably rotate with respect to the first bearing 332. In the upper portion of the plug 330 above the sealing ring 323, the inner peripheral surface of the bore 331 is spaced from the outer peripheral surface of the rotor 320 by a gap. As can be seen from FIG. 11, the length of the second bearing 314 in the axial direction of the housing 310 (the distance by which the support projection 313 projects from the end wall 311 of the housing 310 to the top of the support projection 313) is greater than the length of the first bearing 332 (the distance from the lower end of the bore 331 of the plug 330 to the ledge 322) in the axial direction of the housing 310.

Figure 12:
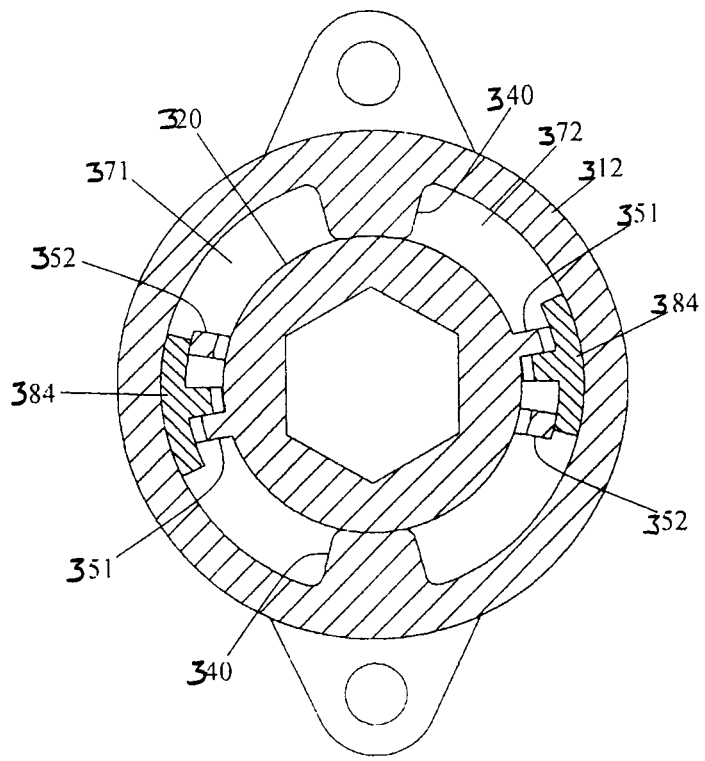
FIG. 12 is a cross-sectional view taken along line H-H in FIG. 11.

Inside the housing 310, the housing vanes 340 are arranged for rotation together with the housing 310 (see FIG. 12). The viscous liquid fills chambers 371 and 372 defined by the housing vanes 340 (see FIG. 12). The rotor vanes are arranged for rotation inside the chambers 371 and 372 defined by the housing vanes 340 with the rotor 320 (see FIG. 12). The rotor vanes employed in this embodiment include a first pressurizing portion 351 and a second pressurizing portion 352. When the housing 310 rotates around the rotor 320, the housing vanes 340 function as devices for pressurizing the viscous liquid. When the rotor 320 rotates inside the housing 310, the rotor vanes (the first and second pressurizing portions 351 and 352) function as devices for pressurizing the viscous liquid.

The rotor vanes (the first and second pressurizing portions 351 and 352) have check valves. Each check valve has a valve body 384. Each check valve is configured to allow the viscous liquid to flow only in one direction by a combination of first, second and third grooves 381, 382 and 383 formed in the first and second pressurizing portions 351 and 352, and the valve body 384, respectively.

More specifically, the first and second pressurizing portions 351 and 352 are spaced by a certain distance from each other. The first groove 381 is formed in a position remote from the rotor 320, and the second groove 382 is formed in a position near the rotor 320 (see FIGS. 13 and 14). The valve body 384 includes a main body 384a which has a width always allowing contact with tip end surfaces of the first and second pressurizing portions 351 and 352. The main body 384a is arranged between the peripheral wall 312 of the housing 310 and the first and second pressurizing portions 351 and 352. The valve body 384 also includes a projection 384b which projects from the main body 384a. The projection 384b is arranged between the first and second pressurizing portions 351 and 352. The projection 384b has a third groove 383 which continues to the second groove 382 when the projection 384b is in contact with the second pressurizing portion 352 (see FIGS. 14 and 15). The third groove 383 is formed in a position where it does not continue to the first groove 381 when the projection 384b is in contact with the first pressurizing portion 351 (see FIG. 13).

Figure 13:
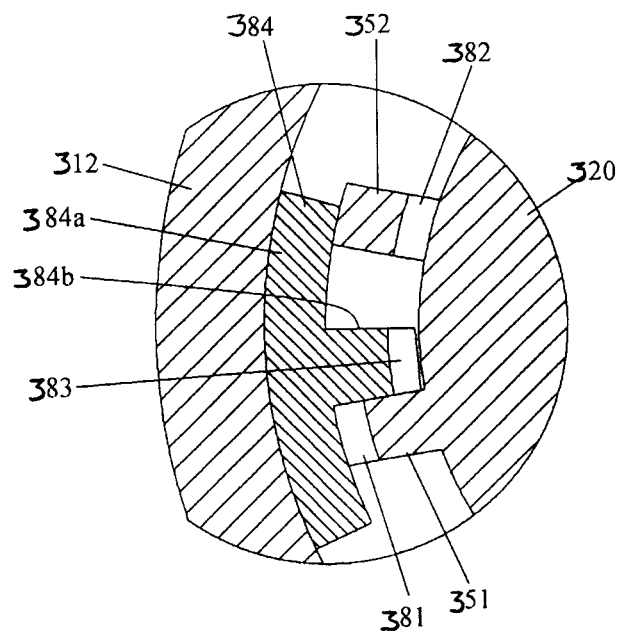
FIGS. 13 and 14 are enlarged views of a portion of FIG. 12 showing the operation of one of the check valves employed in the rotary damper of FIG. 9.
Figure 14:
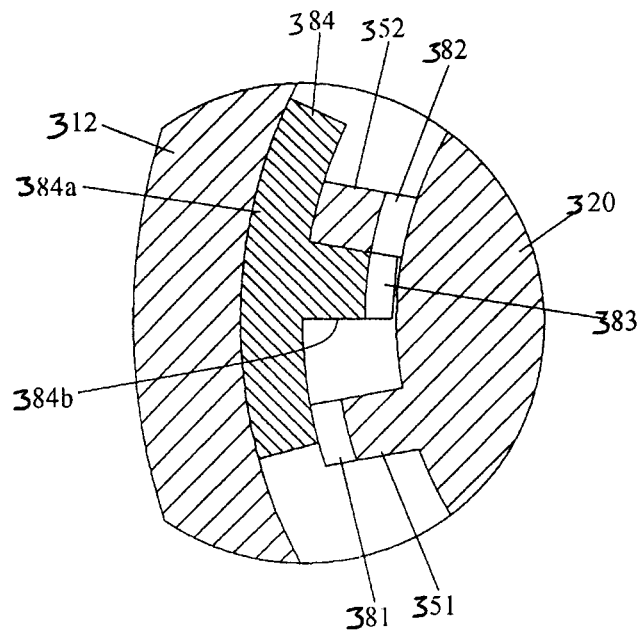

In the check valve configured as described above, when the rotor 320 rotates clockwise in FIG. 13, that is, when the check valve is closed, the second pressurizing portion 352 pressurizes the viscous liquid. As a result, the main body 384a of the valve body 384 receives the resistance of the viscous liquid so that the projection 384b of the valve body 384 comes into contact with the first pressurizing portion 351 (see FIG. 13). The viscous liquid flows through the second groove 382 into the third groove 383 and is dammed up by the first pressurizing portion 351 (see FIG. 13). Consequently, a braking force reducing the rotational speed of the rotor 320 is produced. Conversely, when the rotor 320 rotates counterclockwise in FIG. 14, that is, when the check valve opens, the first pressurizing portion 351 pressurizes the viscous liquid. As a result, the main body 384a of the valve body 384 receives the resistance of the viscous liquid so that the projection 384b of the valve body 384 comes into contact with the second pressurizing portion 352 (see FIG. 14). The viscous liquid is not dammed up by the second pressurizing portion 352 and flows through the first and third grooves 381 and 383 into the second groove 382 (see FIG. 14). Consequently, a braking force reducing the rotational speed of the rotor 320 is not produced.

Figure 15:
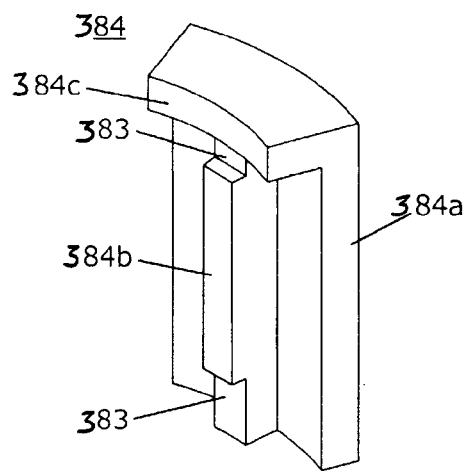
FIG. 15 is an axonometric view of a valve body employed in the rotary damper of FIG. 9.

The valve body 384 further includes a stop 384c made of a resin and arranged between the plug 330 and the rotor vanes (the first and second pressurizing portions 351 and 352) (see FIGS. 11 and 15).

According to the rotary damper thus configured, even when the plug 330 and the rotor vanes (the first and second pressurizing portions 351 and 352) are made of metal, the stop 384c which is made of a resin and is interposed between the plug 330 and the rotor vanes (the first and second pressurizing portions 351 and 352) can prevent direct contact between the plug 330 and the rotor vanes (the first and second pressurizing portions 351 and 352), and therefore can reduce abrasion of the plug 330 and the rotor vanes (the first and second pressurizing portions 351 and 352).

Figure 16:
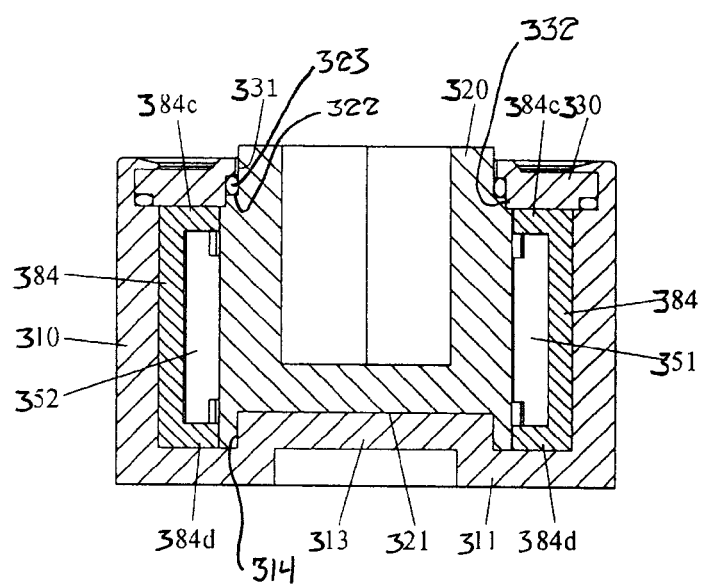
FIG. 16 is a cross-sectional view of another embodiment of a rotary damper according to the present invention.
Figure 17:
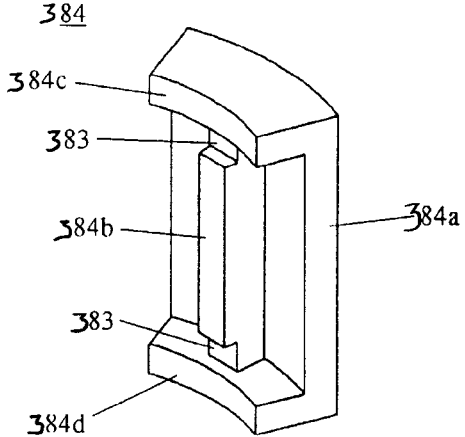
FIG. 17 is an axonometric view of a valve body employed in the rotary damper of FIG. 16.
Figure 18:
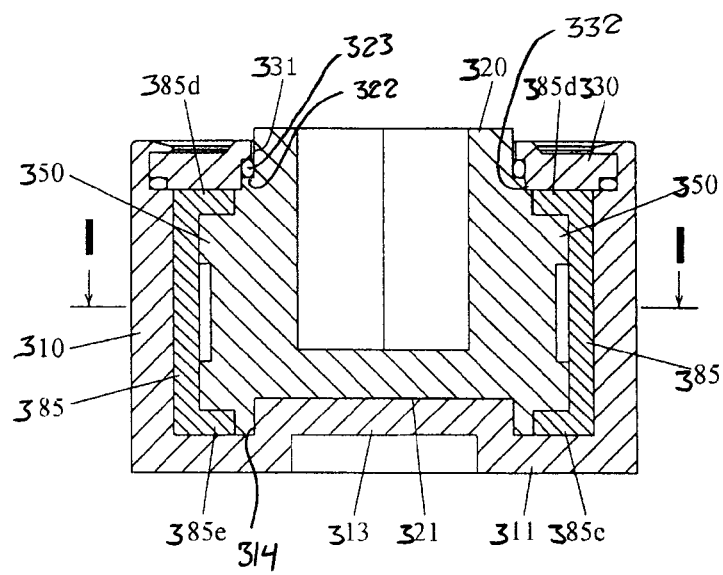
FIG. 18 is a cross-sectional view of another embodiment of a rotary damper according to the present invention.
Figure 19:
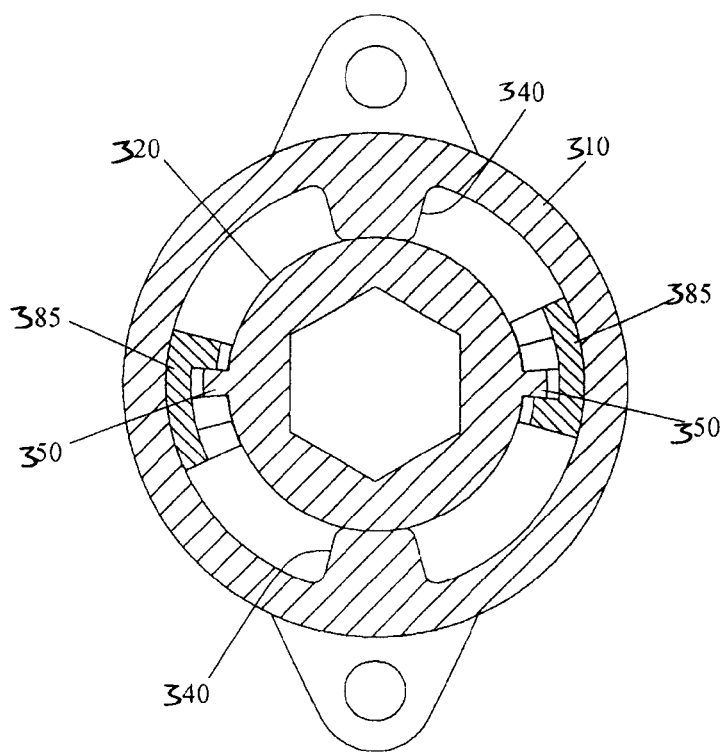
FIG. 19 is a cross-sectional view taken along line I-I in FIG. 18.

FIGS. 16 and 17 illustrate another embodiment of a rotary damper according to the present invention. This embodiment differs from the previous embodiment with respect to the structure of each valve body 384. Each valve body 384 of this embodiment further includes a stop 384d made of a resin and arranged between the end wall 311 and the rotor vanes (first and second pressurizing portions 351 and 352).

An experiment was performed using this embodiment of a rotary damper and a comparative example of a rotary damper which did not have stops 384c and 384d.

In this experiment, the rotor was rotated by 60 degrees from an initial position in a braking force generating direction 30,000 times with the housing kept in a fixed state. The load applied to the rotor was 14 Nm, and plugs and rotor vanes in both the embodiment and the comparative example were made of metal.

After the experiment, the thickness of the plugs was measured. The abrasion measured in the comparative example was 0.026 mm, while the abrasion measured in the embodiment of FIGS. 16 and 17 was only 0.0035 mm. Before and after the experiment, the time required for rotation of the rotor by 60 degrees from an initial position in a braking force generating direction was measured. In the comparative example, the times before and after the experiment were 1.9 seconds and 0.8 second, respectively, so a remarkable decrease in the braking characteristics was observed. In the embodiment of FIGS. 16 and 17, the times before and after the experiment were 1.9 seconds and 1.5 seconds, respectively, so a decrease in the braking characteristics was suppressed. Therefore, this embodiment of a rotary damper can improve durability.

Further, in this embodiment, even when the rotor 320 receives an unbalanced load and rotates eccentrically, abrasion of the end wall 311 and the rotor vanes (the first and second pressurizing portions 351 and 352) can be small because stop 384d made of a resin is interposed between the end wall 311 of the housing 310 and the rotor vanes (the first and second pressurizing portions 351 and 352) in addition to stop 384c. Therefore, durability can be further increased.

FIGS. 18-22 illustrate another embodiment of a rotary damper according to the present invention. As shown in these figures, this embodiment differs from the rotary damper of FIG. 9 with respect to the structure of the rotor vanes and the check valves.

The check valves employed in this are configured to allow a viscous liquid to flow only in one direction by a combination of a first groove 386 formed in each of two rotor vanes 350 and second and third grooves 387 and 388 formed in each of two valve bodies 385.

Figure 20:
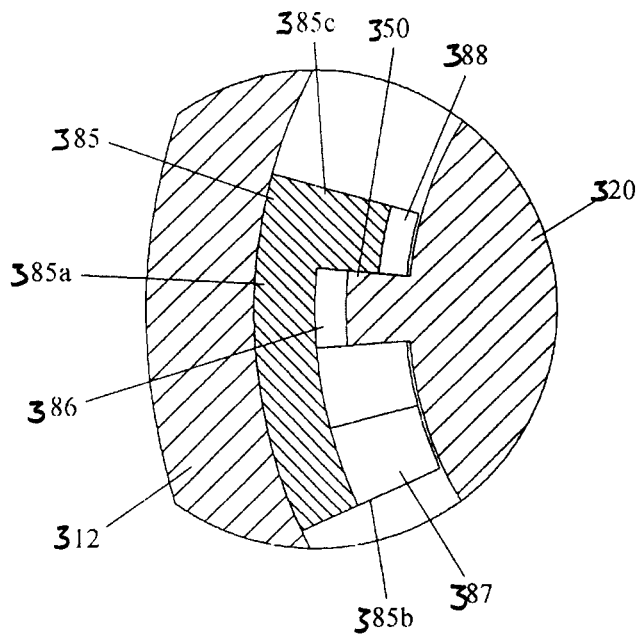
FIGS. 20 and 21 are enlarged views of a portion of FIG. 10 showing the operation of one of the check valves employed in the rotary damper of FIG. 18.
Figure 21:
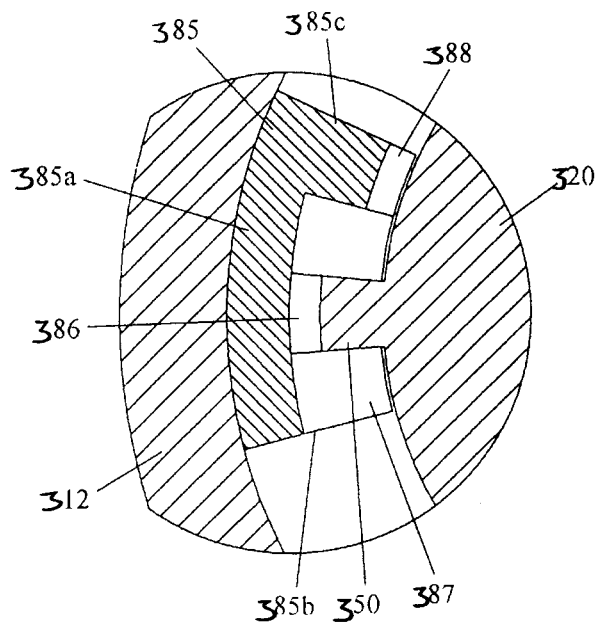
Figure 22:
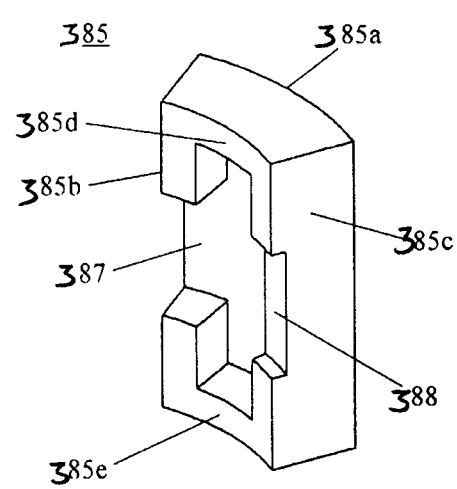
FIG. 22 is an axonometric view of a valve body employed in the rotary damper of FIG. 18.

More specifically, each rotor vane 350 has a first groove 386 at its tip end (see FIGS. 20 and 21). Each valve body 385 is formed of a main body 385a having a predetermined width and arranged between one of the rotor vanes 350 and the peripheral wall 312 of the housing 310, a first projecting wall 385b having a second groove 387 and projecting from the main body 385a, a second projecting wall 385c having a third groove 388 and projecting from the main body 385a with a constant space kept with respect to the first projecting wall 385b, a stop 385d made of a resin and arranged between the plug 330 and one of the rotor vanes 350, and a stop 385e made of a resin and arranged between the end wall 311 of the housing 310 and one of the rotor vanes 350 (see FIGS. 20 to 22). Each rotor vane 350 is arranged between the first and second projecting walls 385b and 385c. When the rotor vane 350 comes into contact with the second projecting wall 385c, the first and third grooves 386 and 388 are not connected together, and the second projecting wall 385c closes the first groove 386 (see FIG. 20). When the rotor vane 350 comes into contact with the first projecting wall 385b, the first and second grooves 386 and 387 are connected together (see FIG. 21).

In the check valve thus configured, when the rotor 320 rotates clockwise in FIG. 20, the second projecting wall 385c of the valve body 385 comes into contact with one of the rotor vanes 350 (see FIG. 20). In this state, the viscous liquid flows into the third groove 388 and is dammed up by the rotor vane 350 (see FIG. 20). This generates a braking force to decrease the rotational speed of the rotor 320. When the rotor 320 rotates counterclockwise in FIG. 21, the first projecting wall 385b of the valve body 385 comes into contact with one of the rotor vanes 350 (see FIG. 21). In this state, the viscous liquid is not dammed up by the rotor vane 350 and flows through the second and first grooves 387 and 386 into the third groove 388. Consequently, a braking force decreasing the rotational speed of the rotor 320 is not generated.

In the rotary damper configured as described above, even when the plug 330 and the rotor vane 350 are made of metal, stop 385d which is made of a resin can prevent direct contact between the plug 330 and the rotor vanes 350 and therefore can reduce abrasion of the plug 330 and the rotor vanes 350.

Even when the rotor 320 receives an unbalanced load and rotates eccentrically, abrasion of the end wall 311 and the rotor vanes 350 can be reduced owing to stop 385d as well as stop 385e made of a resin interposed between the end wall 311 of the housing 310 and the rotor vanes 350. This further increases durability.

What is claimed is:

1. A rotary damper comprising:
a housing having a first lengthwise end having a connecting portion for connecting the housing to a hinge and a second lengthwise end;
a rotor rotatably disposed inside the housing;
a fluid sealed inside the housing surrounding the rotor;
a first bearing rotatably supporting the rotor for rotation with respect to the housing at the first end of the housing; and
a second bearing rotatably supporting the rotor for rotation with respect to the housing at the second end of the housing and having a length in an axial direction of the rotor which is greater than a length of the first bearing in the axial direction of the rotor.

2. A rotary damper as claimed in claim 1 wherein the length of the second bearing in the axial direction of the rotor is 1.5-10 times the length of the first bearing in the axial direction of the rotor.

3. A rotary damper as claimed in claim 1 wherein the length of the second bearing in the axial direction of the rotor is 1.5-5 times the length of the first bearing in the axial direction of the rotor.

4. A rotary damper as claimed in claim 1 wherein the length of the second bearing in the axial direction of the rotor is 1.5-3 times the length of the first bearing in the axial direction of the rotor.

5. A rotary damper as claimed in claim 1 wherein the second end of the housing has a bottom surface which closes off the second end and a projection which extends from the bottom surface towards the first end of the housing, the rotor has a recess which rotatably receives the projection, and a top surface of the projection contacts a bottom surface of the recess.

6. A rotary damper as claimed in claim 1 wherein the second end of the housing has a bottom surface which closes off the second end and a projection which extends from the bottom surface towards the first end of the housing, the rotor has a recess which rotatably receives the projection, and a top surface of the projection is spaced from a bottom surface of the recess by a gap over the entire top surface of the projection.

7. An opening and closing mechanism for a vehicle door comprising:
a rotary damper as claimed in claim 1; and
a hinge having a first hinge portion for connection to a vehicle door, a second hinge portion for connection to a vehicle body, the second hinge portion being rotatable about a rotational axis with respect to the first hinge portion to enable opening and closing of the vehicle door with respect to the vehicle body, and a shaft having an axis coinciding with the rotational axis of the hinge, wherein the shaft is secured to the rotor of the rotary damper and to one of the first and second hinge portions, and the housing is secured to the other of the first and second hinge portions.

8. An opening and closing mechanism for a vehicle door as claimed in claim 7 wherein the length of the second bearing in the axial direction of the rotor is 1.5-10 times the length of the first bearing in the axial direction of the rotor.

9. A vehicle door arrangement comprising:
a vehicle body; and
a vehicle door mounted on the vehicle body by an opening and closing mechanism as claimed in claim 7.

10. A vehicle door arrangement as claimed in claim 9 wherein the vehicle door comprises a tailgate.

* * * * *